(12) United States Patent
Broder et al.

(10) Patent No.: US 8,688,521 B2
(45) Date of Patent: Apr. 1, 2014

(54) SYSTEM AND METHOD TO FACILITATE MATCHING OF CONTENT TO ADVERTISING INFORMATION IN A NETWORK

(75) Inventors: Andrei Zary Broder, Menlo Park, CA (US); Marcus Felipe Fontoura, Los Gatos, CA (US); Vanja Josifovski, Los Gatos, CA (US); Lance Alan Riedel, Menlo Park, CA (US)

(73) Assignee: Yahoo! Inc., Sunnyvale, CA (US)

( * ) Notice: Subject to any disclaimer, the term of this patent is extended or adjusted under 35 U.S.C. 154(b) by 1201 days.

(21) Appl. No.: 11/781,147

(22) Filed: Jul. 20, 2007

(65) Prior Publication Data

US 2009/0024468 A1  Jan. 22, 2009

(51) Int. Cl.
  *G06Q 30/00* (2012.01)
  *G06F 7/00* (2006.01)
  *G06F 17/30* (2006.01)

(52) U.S. Cl.
  USPC ............ 705/14.71; 705/14.73; 707/700; 707/710

(58) Field of Classification Search
  USPC ............ 705/1–20; 707/1–10, 700, 710; 709/1–10
  See application file for complete search history.

(56) References Cited

U.S. PATENT DOCUMENTS

| | | | |
|---|---|---|---|
| 6,401,075 B1 | 6/2002 | Mason et al. | |
| 6,446,061 B1 | 9/2002 | Doerre et al. | |
| 6,484,148 B1 | 11/2002 | Boyd | |
| 6,711,585 B1 | 3/2004 | Copperman et al. | |
| 6,712,702 B2 | 3/2004 | Goldberg et al. | |
| 7,003,506 B1 | 2/2006 | Fisk | |
| 7,062,510 B1 | 6/2006 | Eldering | |
| 7,136,875 B2 | 11/2006 | Anderson et al. | |
| 7,162,480 B2 | 1/2007 | Vishik | |
| 7,299,194 B1 | 11/2007 | Manganaris et al. | |

(Continued)

FOREIGN PATENT DOCUMENTS

CN  1826596 A   8/2006
KR  2006-0103034 A  9/2006

(Continued)

OTHER PUBLICATIONS

Written Opinion of the International Searching Authority for Related Foreign Application PCT/US2008/067938.

(Continued)

*Primary Examiner* — Sun Li
(74) *Attorney, Agent, or Firm* — Brinks Gilson & Lione

(57) ABSTRACT

A system and method to facilitate matching of content to advertising information in a network are described. A request for advertising information is received over a network, the advertising information to be displayed for a user entity in association with content information within a web page requested by the user entity. Advertising information related to one or more themes of the content information on the web page is further determined, the themes representing subject matter contextually related to the content information. Advertisements are further selected from the advertising information based on keywords and metadata stored within the web page and based on a set of predetermined parameters stored within the data storage module. The selected advertisements are further ranked to obtain a ranked list of advertisements. The ranked list of advertisements is subsequently optimized based on feedback data to obtain a list of optimized advertisements to be displayed for the user entity on the requested web page.

22 Claims, 12 Drawing Sheets

(56) References Cited

U.S. PATENT DOCUMENTS

| | | |
|---|---|---|
| 7,447,677 B2 | 11/2008 | Milligan et al. |
| 7,496,943 B1 | 2/2009 | Goldberg et al. |
| 2001/0034762 A1 | 10/2001 | Jacobs et al. |
| 2001/0044837 A1 | 11/2001 | Talib et al. |
| 2002/0078192 A1 | 6/2002 | Kopsell et al. |
| 2002/0082923 A1 | 6/2002 | Merriman et al. |
| 2002/0161648 A1 | 10/2002 | Mason et al. |
| 2003/0040960 A1 | 2/2003 | Eckmann |
| 2003/0046148 A1 | 3/2003 | Rizzi et al. |
| 2003/0101095 A1 | 5/2003 | Suzuki |
| 2004/0015401 A1 | 1/2004 | Lee et al. |
| 2004/0059708 A1 | 3/2004 | Dean et al. |
| 2004/0181525 A1 | 9/2004 | Itzhak et al. |
| 2004/0243466 A1 | 12/2004 | Trzybinski et al. |
| 2004/0267725 A1 | 12/2004 | Harik |
| 2005/0033641 A1 | 2/2005 | Jha et al. |
| 2005/0033771 A1 | 2/2005 | Schmitter et al. |
| 2005/0149395 A1* | 7/2005 | Henkin et al. .................. 705/14 |
| 2005/0165638 A1 | 7/2005 | Piller |
| 2005/0216448 A1 | 9/2005 | Talib et al. |
| 2005/0267872 A1 | 12/2005 | Galai et al. |
| 2006/0122994 A1 | 6/2006 | Kapur et al. |
| 2006/0242017 A1 | 10/2006 | Libes et al. |
| 2006/0287920 A1 | 12/2006 | Perkins et al. |
| 2007/0016469 A1* | 1/2007 | Bae et al. .................. 705/14 |
| 2007/0073758 A1 | 3/2007 | Perry et al. |
| 2007/0174255 A1 | 7/2007 | Sravanapudi et al. |
| 2007/0198341 A1 | 8/2007 | Park |
| 2007/0239530 A1 | 10/2007 | Datar |
| 2007/0288454 A1* | 12/2007 | Bolivar et al. .................. 707/5 |
| 2008/0010142 A1 | 1/2008 | O'Brien et al. |
| 2008/0040175 A1 | 2/2008 | Dellovo |
| 2008/0065624 A1* | 3/2008 | Sun et al. .................. 707/5 |
| 2008/0086372 A1 | 4/2008 | Madhavan |
| 2008/0086382 A1 | 4/2008 | Ur |
| 2008/0140524 A1* | 6/2008 | Anand et al. .................. 705/14 |
| 2008/0140591 A1 | 6/2008 | Agarwal et al. |
| 2008/0294577 A1 | 11/2008 | Agarwal |
| 2008/0313142 A1 | 12/2008 | Wang et al. |

FOREIGN PATENT DOCUMENTS

| | | |
|---|---|---|
| TW | 511031 | 11/2002 |
| TW | 200301634 | 7/2003 |
| TW | 200630828 | 9/2006 |
| WO | 02/19175 A2 | 3/2002 |

OTHER PUBLICATIONS

International Search Report for Related Foreign Application PCT/US2008/067938.

U.S. Appl. No. 11/708,272, filed Feb. 20, 2007, Broder, Office Action dated Jan. 5, 2012.

Taiwanese Office Action for Application No. 097125193 dated Jun. 24, 2013 (and English translation).

\* cited by examiner

SYSTEM AND METHOD TO FACILITATE MATCHING OF CONTENT TO ADVERTISING INFORMATION IN A NETWORK

TECHNICAL FIELD

The present invention relates generally to the field of network-based communications and, more particularly, to a system and method to facilitate matching of content to advertising information in a network, such as the Internet.

BACKGROUND OF THE INVENTION

The explosive growth of the Internet as a publication and interactive communication platform has created an electronic environment that is changing the way business is transacted. As the Internet becomes increasingly accessible around the world, users need efficient tools to navigate the Internet and to find content available on various websites.

Web advertising supports a large swath of today's Internet ecosystem. A large portion of the advertising market over the Internet consists of textual advertisements or ads, which encompass short text messages distributed to the users. One main advertising channel used to distribute textual ads is the sponsored search advertising channel, which consists in placing ads on the results pages from a web search engine, with ads driven by the originating query. Another main advertising channel is the contextual advertising channel, which refers to the placement of commercial ads within the content of a generic web page.

Given a specific page, rather than placing generic ads, it would be preferable to display ads related to the content of the page to provide a better user experience and to increase the probability of user clicks. Previous approaches estimated the ad relevance based on the co-occurrence of the same words or phrases within the ad and within the page. However, targeting mechanisms based solely on phrases found within the text of the page can lead to erroneous results. For example, a page about a famous golfer named "John Maytag" might trigger an ad for "Maytag dishwashers," since Maytag is a popular appliance brand. Thus, it would be advantageous to provide a matching mechanism that combines a semantic phase with the traditional keyword matching, also known as syntactic, phase in order to improve the relevance of the displayed ads.

SUMMARY OF THE INVENTION

A system and method to facilitate matching of content to advertising information in a network are described. A request for advertising information is received over a network, the advertising information to be displayed for a user entity in association with content information within a web page requested by the user entity. Advertising information related to one or more themes of the content information on the web page is further determined, the themes representing subject matter contextually related to the content information. Advertisements are further selected from the advertising information based on keywords and metadata stored within the web page and based on a set of predetermined parameters stored within the data storage module. The selected advertisements are further ranked to obtain a ranked list of advertisements. The ranked list of advertisements is subsequently optimized based on feedback data to obtain a list of optimized advertisements to be displayed for the user entity on the requested web page.

Other features and advantages of the present invention will be apparent from the accompanying drawings, and from the detailed description, which follows below.

BRIEF DESCRIPTION OF THE DRAWINGS

The present invention is illustrated by way of example and not intended to be limited by the figures of the accompanying drawings in which like references indicate similar elements and in which.

DETAILED DESCRIPTION

In the following description, numerous details are set forth for purpose of explanation. However, one of ordinary skill in the art will realize that the invention may be practiced without the use of the specific details. In other instances, well-known structures and devices are shown in block diagram form in order not to obscure the description of the invention with unnecessary detail.

In embodiments described in detail below, users access an entity, such as, for example, a content service provider, over a network such as the Internet and further input various data, which is subsequently captured by selective processing modules within the network-based entity. The user input typically comprises one or more "events." In one embodiment, an event is a type of action initiated by the user, typically through a conventional mouse click command. Events include, for example, advertisement clicks, search queries, search clicks, sponsored listing clicks, page views and advertisement views. However, events, as used herein, may include any type of online navigational interaction or search-related events.

Each of such events initiated by a user triggers a transfer of content information to the user, the content information being typically displayed in a web page on the user's client computer. The web page incorporates content provided by publishers, such as, for example, articles, and/or other data of interest to users, often displayed in a variety of formats. In addition, the web page may also incorporate advertisements provided on behalf of various advertisers over the network by an advertising agency, which may be included within the entity, or in the alternative, may be coupled to the entity and the advertisers, for example.

In embodiments described in detail below, the entity selects the advertisements to be displayed within the web page, such that each advertisement is contextual related to content information provided by the publishers. In addition, each advertisement matches any text and metadata information displayed within the web page and additional parameters applied by the entity, as described in detail below. In alternate embodiments, other classifications of web pages and advertisements may be used, such as classifications based on user interests, as determined by a behavioral targeting system, for example.

Figure 1:
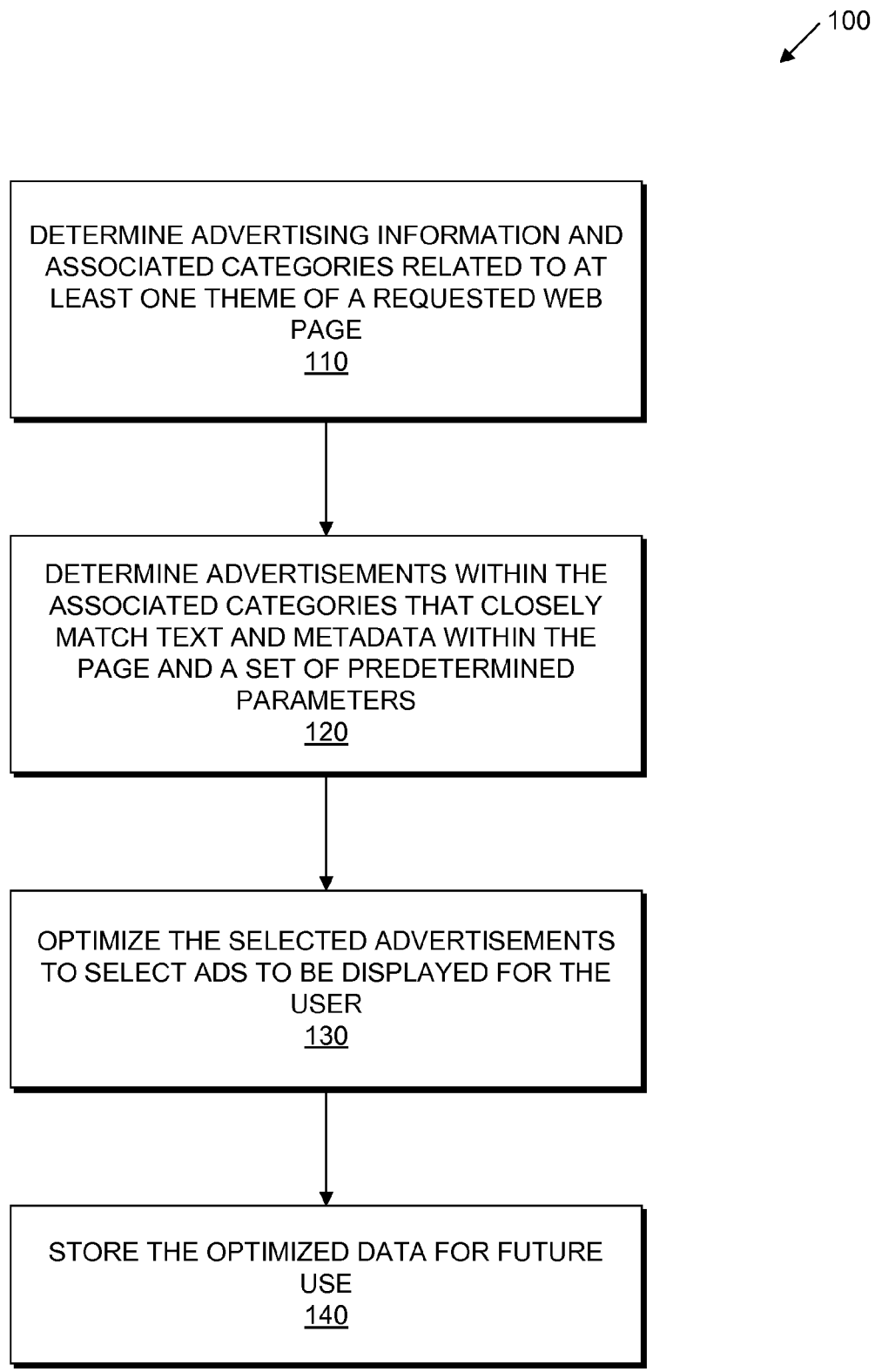
FIG. 1 is a flow diagram illustrating a method to facilitate matching of content to advertising information, according to one embodiment of the invention.

FIG. 1 is a flow diagram illustrating a method to facilitate matching of content to advertising information, according to one embodiment of the invention. As shown in FIG. 1, the sequence 100 starts at processing block 110 with a determination of advertising information and associated categories, such as, for example, advertisements classified in respective advertising categories, the advertisements being related to one or more themes of a web page requested by a user entity.

In one embodiment, users or agents of the users access a publisher over a network and request a web page populated with content information. Generally, the content information is presented to the user in a variety of formats, such as, for example, text, images, video, audio, animation, program code, data structures, hyperlinks, and other formats. The content is typically presented as a web page and may be formatted according to the Hypertext Markup Language (HTML), the Extensible Markup Language (XML), the Standard Generalized Markup Language (SGML), or any other known language.

The publisher further transmits the requested web page content information to the user to be displayed on the user's machine. At the same time, Hypertext Transfer Protocol (HTTP) call routines, or, in the alternative, call routines based on other known protocols, residing on the web page are transmitted to the entity to request advertisements for insertion into the web page via an iframe mechanism, or JavaScript or any other known embedding mechanism.

In an alternate embodiment, upon receipt of the web page request, the publisher may access the entity to request advertisements for insertion into the web page prior to display of the web page on the client machine associated with the user.

The entity receives the advertising request and selects advertising information that matches one or more themes of the web page, as described in further detail below. As used herein, in one embodiment, advertising information is sent to the user that requests the web page and includes multiple advertisements, which may include a hyperlink, such as, for example, a sponsor link, an integrated link, an inside link, or other known link. The format of an advertisement may or may not be similar to the format of the content displayed on the web page and may include, for example, text advertisements, graphics advertisements, rich media advertisements, and other known types of advertisements. Alternatively, the advertisements are transmitted to the publisher, which assembles the web page content and the advertisements for display on the client machine coupled to the user.

Next, referring back to FIG. 1, at processing block 120, advertisements that closely match text and metadata within the requested web page and further match a set of predetermined parameters are determined. In one embodiment, the web page is parsed to extract associated text and metadata. In addition, predetermined parameters are also retrieved from a database and the information is subsequently used to select and rank advertisements, as described in further detail below.

The sequence 100 continues at processing block 130 with a further optimization of the selected advertisements to filter and select specific advertisements to be displayed for the user. In one embodiment, feedback data related to prior associations between web pages and corresponding displayed advertisements is used to filter the selected and ranked advertisements, as described in further detail below.

Finally, at processing block 140, the sequence 100 ends with storage of the optimized data for future use. In one embodiment, each advertisement/page association is aggregated and stored within one or more associated databases, as described in further detail below.

Figure 2:
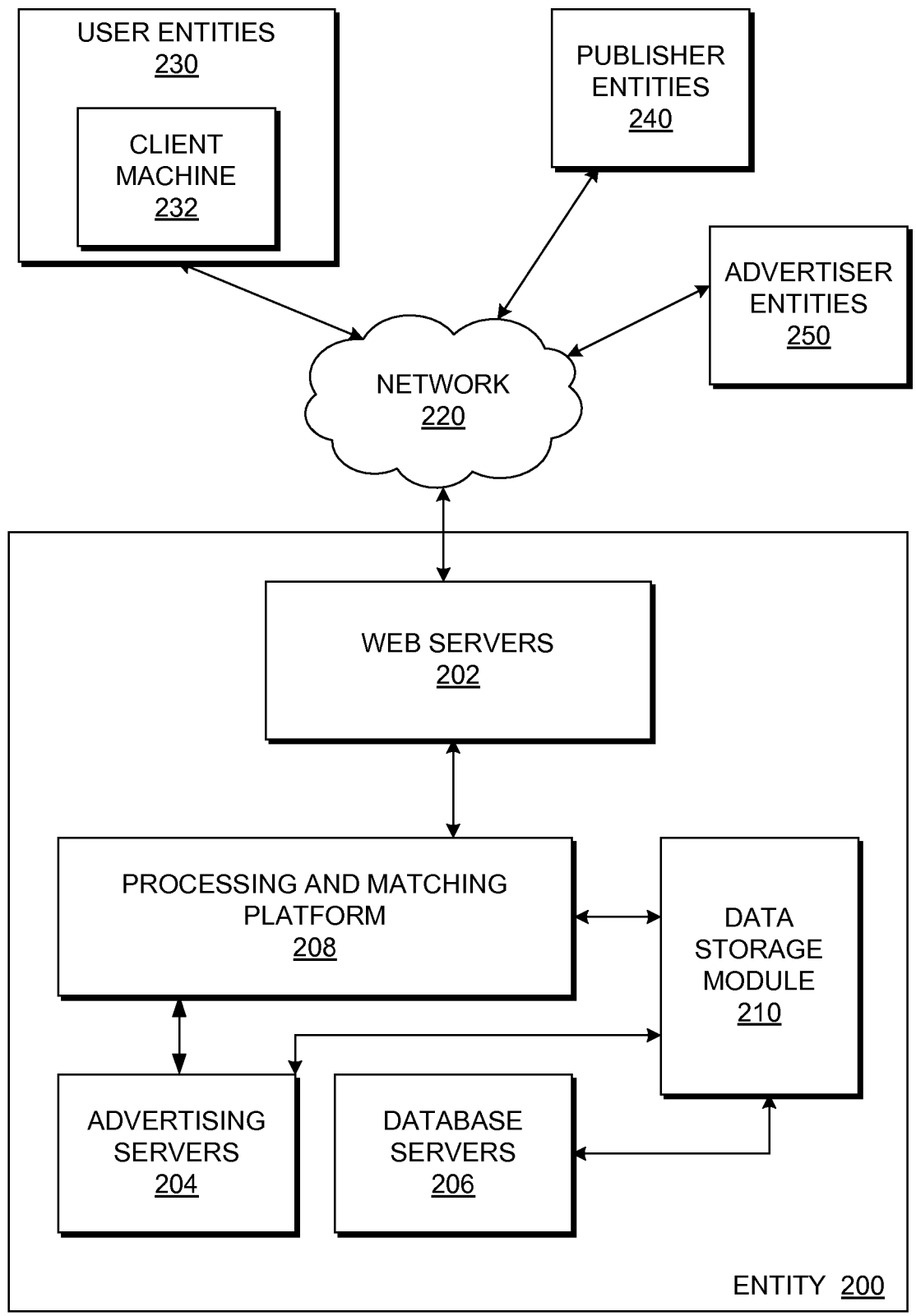
FIG. 2 is a block diagram illustrating an exemplary network-based entity containing a system to facilitate matching of content to advertising information, according to one embodiment of the invention.

FIG. 2 is a block diagram illustrating an exemplary network-based entity containing a system to facilitate matching of content to advertising information. While an exemplary embodiment of the present invention is described within the context of an entity 200 enabling automatic matching of web page content to advertising information, it will be appreciated by those skilled in the art that the invention will find application in many different types of computer-based, and network-based, entitles, such as, for example, commerce entities, content provider entities, or other known entities having a presence on the network.

In one embodiment, the entity 200 is a network content service provider, such as, for example, Yahoo! and its associated properties, and includes one or more front-end web processing servers 202, which may, for example, deliver web pages to multiple users, (e.g., markup language documents), and/or handle search requests to the entity 200, and/or provide automated communications to/from users of the entity 200, and/or deliver images to be displayed within the web pages, and/or deliver content information to the users in various formats. The entity 200 may further include other processing servers, which provide an intelligent interface to the back-end of the entity 200.

The entity 200 further includes one or more back-end servers, for example, one or more advertising servers 204, and one or more database servers 208. Each server maintains and facilitates access to one or more data storage modules 210. In one embodiment, the advertising servers 204 are coupled to the data storage module 210 and are configured to transmit and receive advertising content, such as, for example, advertisements, sponsored links, integrated links, and other known types of advertising content, to/from advertiser entities via the network 220. In one embodiment, the entity 200 further includes a system to facilitate matching of content to advertising information within the network-based entity 200, as described in further detail below. The system further comprises a processing and matching platform 208 coupled to the data storage module 210. The platform 208 is further coupled to the web servers 202 and the advertising servers 204.

The network-based entity 200 may be accessed by a client program, such as a browser (e.g., the Internet Explorer™ browser distributed by Microsoft Corporation of Redmond, Wash., Netscape Navigator™ browser, the Mozilla™ browser, a wireless application protocol enabled browser in the case of a cellular phone, a PDA or other wireless device), that executes on a client machine 232 of a user entity 230 and accesses the entity 200 via a network 220, such as, for example, the Internet. Other examples of networks that a client may utilize to access the entity 200 includes a wide area network (WAN), a local area network (LAN), a wireless network (e.g., a cellular network), a virtual private network (VPN), the Plain Old Telephone Service (POTS) network, or other known networks.

In one embodiment, other network entities may also access the network-based entity 200 via the network 220, such as, for example, publishers 240, which communicate with the web servers 202 and the users 230 to populate web pages with appropriate content information and to display the web pages for the users 230 on their respective client machines 232, and advertisers 250, which communicate with the web servers 202 and the advertising servers 204 to transmit advertisements to be subsequently displayed in the web pages requested by the users 230. The publishers 240 are the owners of the web pages on which the advertisements are displayed and typically aim to maximize advertising revenue while providing a good user experience. The advertisers 250 supply the ads in specific temporal and thematic campaigns and typically try to promote products and services during those campaigns.

Figure 3:
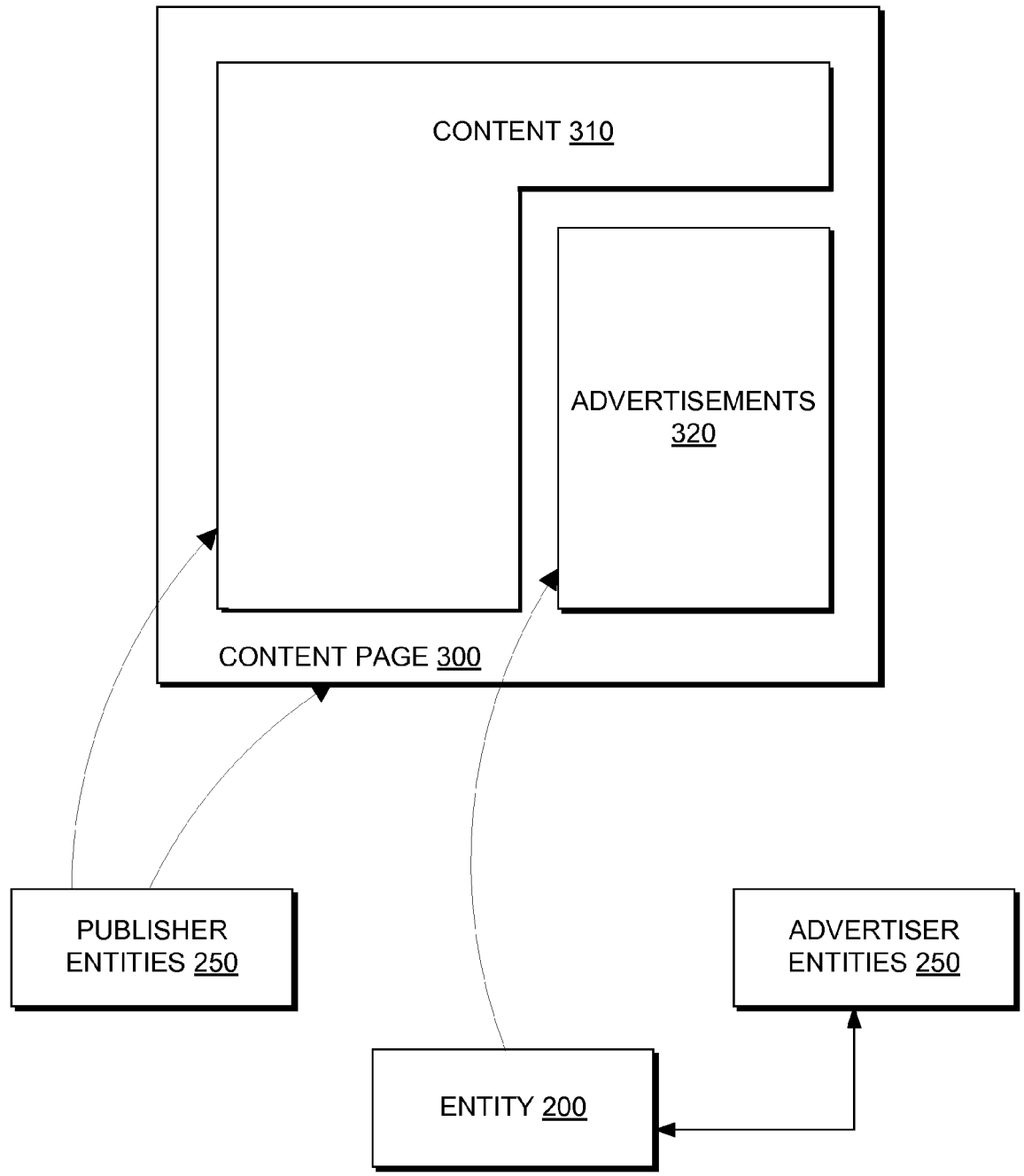
FIG. 3 is a block diagram illustrating an exemplary interface to display content and associated advertising information for the user according to one embodiment of the invention.

FIG. 3 is a block diagram illustrating an exemplary interface to display content and associated advertising information for the user, according to one embodiment of the invention. As illustrated in FIG. 3, a content page 300, such as, for example, a web page requested by a user or an agent of the user, incorporates content information provided by the publishers 240 and displayed in a content area 310. In one embodiment, content may include published information, such as, for example, articles, and/or other data of interest to users, often displayed in a variety of formats, such as text, video, audio, hyperlinks, or other known formats.

The web page 300 further incorporates advertisements provided by the advertisers 250 via the entity 200 or, in the alternative, the advertising agency (not shown), which may be included within the entity 200, or in the alternative, may be coupled to the entity 200 and the advertisers 250, for example. In another alternate embodiment, the advertisements may be transmitted to the publishers 240 for subsequent transmission to the users 230.

The advertisements are further displayed in an advertisements area 320. The web page 300 is finally composed and displayed within the client browser running on the client machine 232 associated with the user.

Figure 4:
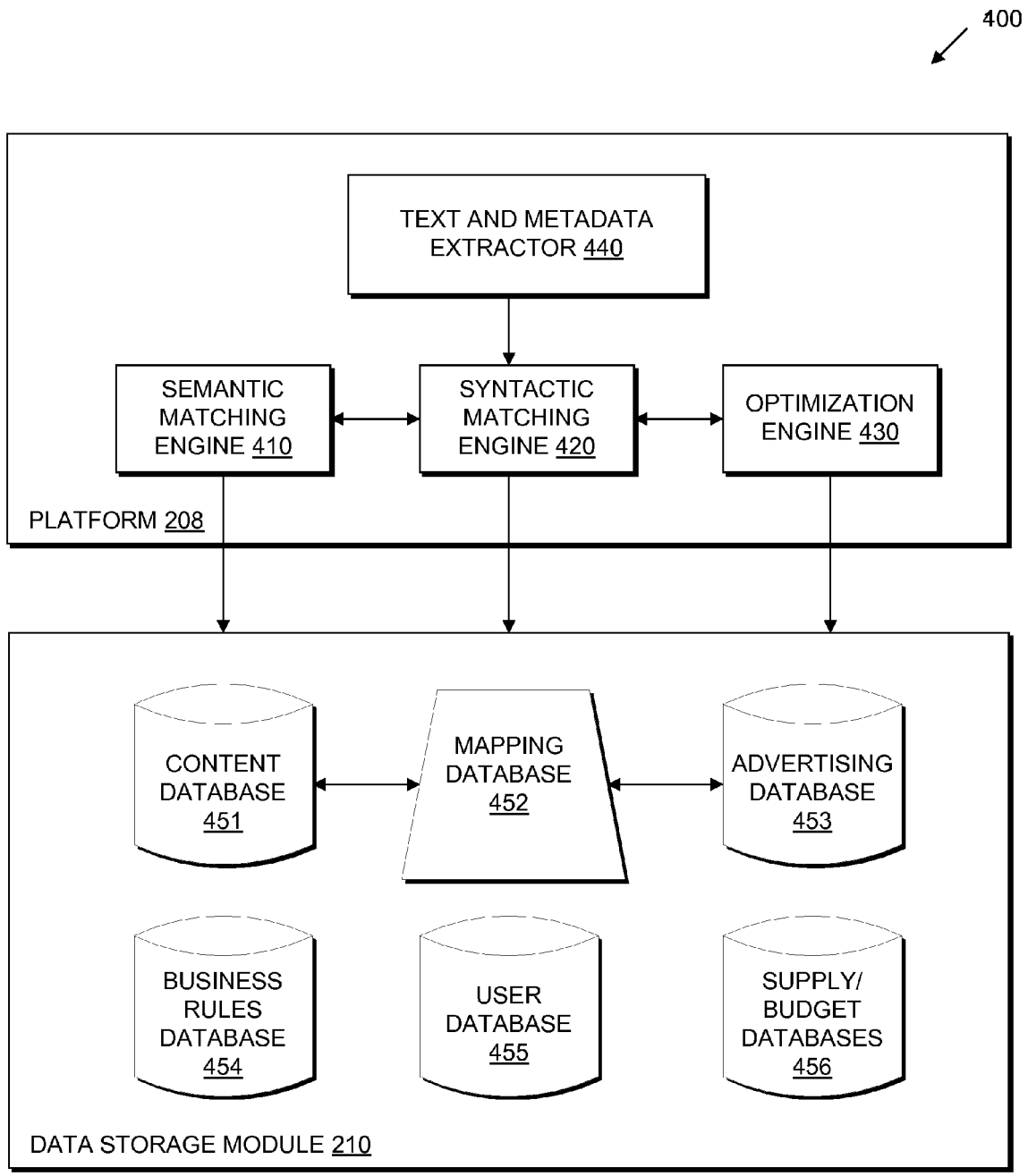
FIG. 4 is a block diagram illustrating the system to facilitate matching of content to advertising information within the network-based entity, according to one embodiment of the invention.

FIG. 4 is a block diagram illustrating a system 400 to facilitate matching of content to advertising information within the network-based entity 200, according to one embodiment of the invention. As illustrated in FIG. 4, the system 400 includes the processing and matching platform 208 coupled to multiple databases within the data storage module 210, such as, for example, a content database 451, an advertising database 453, and a mapping database 452 coupled to the content database 451 and the advertising database 453, as described in further detail below. The data storage module 210 may further include other databases, such as, for example, a business rules database 454, a user database 455, supply/budget databases 456, and other databases (not shown) specifically provided to enable exemplary embodiments of the present invention.

In one embodiment, the processing and matching platform 208 within the system 400 enables matching of the page content to related advertisements based on data stored in the associated databases 451 through 456, as described in further detail below.

In one embodiment, the platform 208 includes a semantic matching engine 410, which is a hardware and/or software module configured to determine which advertisements classified in respective advertising categories are related to one or more themes of the web page requested by the user entity 230 from the publisher 240, such as, for example, one or more general subject matters contextually related to content presented on the web page.

The platform 208 further includes a text and metadata extractor 440, which is a hardware and/or software module configured to extract keywords and associated metadata from web pages, and a syntactic matching engine 420 coupled to the text and metadata extractor 440. The syntactic matching engine 420 is a hardware and/or software module configured to select advertisements that closely match the extracted keywords and metadata and further match a set of predetermined parameters retrieved from respective databases, such as, for example, the business rules database 454, the user database 455, and/or the supply/budget databases 458.

The platform 208 further includes an optimization engine 430, which is a hardware and/or software module configured to filter and select specific advertisements to be displayed for the user based on feedback data related to prior associations between web pages and corresponding displayed advertisements.

In one embodiment, each database within the data storage module 210 may, in one embodiment, be implemented as a relational database, or may, in an alternate embodiment, be implemented as a collection of objects in an object-oriented database. In one embodiment, the content database 451 indexes a plurality of web pages and associated content information, each web page being classified according to its perceived themes. The advertising database 453 stores a plurality of advertisements and associated advertising content information, each advertisement being classified according to one or more themes, which characterize the general subject matter of each advertisement.

In one embodiment, the mapping database 452 stores a mapping matrix, which includes links between web page information stored within the content database 451 and corresponding advertisements stored within the advertising database 453, as described in further detail below in connection with FIG. 5.

Figure 5:
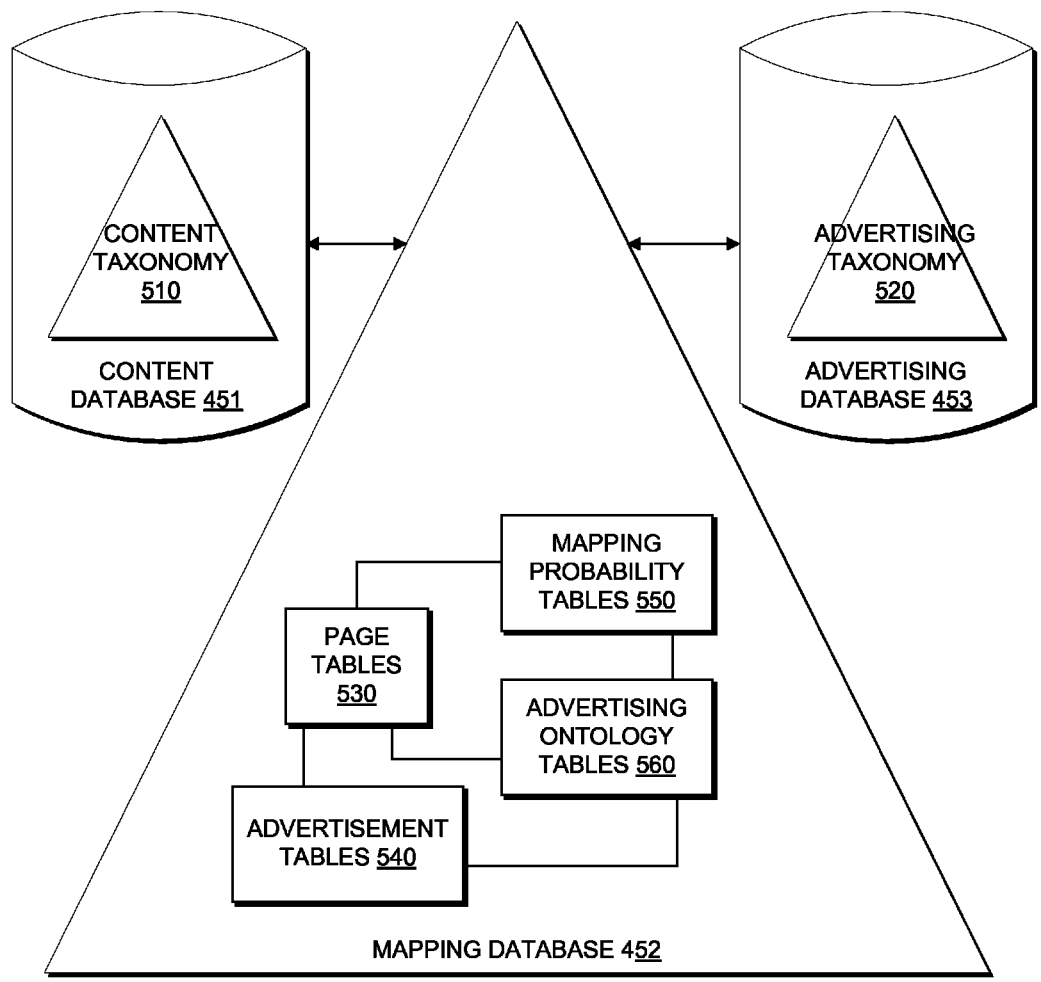
FIG. 5 is a block diagram illustrating a data storage module within the network-based entity, according to one embodiment of the invention.

FIG. 5 is a block diagram illustrating a data storage module within the network-based entity, according to one embodiment of the invention. As shown in FIG. 5, in one embodiment, the web pages and associated content information are further organized into a hierarchical content taxonomy 510 within the database 451 based on associations with their respective events of origin and based on various page parameters, such as, for example, page ancestors, anchor text metadata, publisher entity 240 associated with each respective web page, and other features of the stored web pages. The hierarchical content taxonomy is reviewed, edited, and updated automatically by the processing and matching platform 208, or, in the alternative, manually by editors and/or other third-party entitles.

In one embodiment, the advertisements are further organized into a hierarchical advertising taxonomy 520 within the database 453 based on various advertisement parameters, such as, for example, text of each advertisement offer, advertiser entity 250 associated with each respective advertisement, advertiser industry, target page of each specific advertisement, and other features of the stored advertisements. The hierarchical advertising taxonomy is reviewed, edited, and updated automatically by the processing and matching platform 208, or, in the alternative, manually by editors and/or other third-party entities.

The content taxonomy 510 and the advertising taxonomy 520 are represented as hierarchies of nodes. However, it is to be understood that any other representation of a taxonomy used to classify subject matter may be used in conjunction with the system 400 without deviating from the spirit or scope of the invention. In one embodiment, the matching process requires each taxonomy to provide sufficient differentiation between the common commercial topics. For example, classifying all medical related pages into one node will not result into a good classification since both "sore foot" and "flu" pages will end up in the same node. However, the advertisements suitable for these two concepts may be very different.

As a result, in one embodiment, a taxonomy of around 6000 nodes, primarily built for classifying commercial interest queries, rather than pages or ads, is used to obtain sufficient resolution and to classify both web pages and advertisements within the respective taxonomies 510, 520. Alternatively, other taxonomies may be used in conjunction with the system 400 without deviating from the spirit or scope of this invention. Each node in the exemplary taxonomy described above is represented as a collection of exemplary bid phrases or queries that correspond to that node concept. In one embodiment, each node has on average around 100 queries. The queries placed in the taxonomy are high volume queries and queries of high interest to advertisers 250, as indicated by an unusually high cost-per-click (CPC) price. In one embodiment, the taxonomy is populated by human editors using keyword suggestion tools similar to the ones used by advertising agencies, such as, for example, the entity 200, or an agency coupled to the entity 200, to suggest keywords to advertisers 250.

In one embodiment, the mapping database 452 may store web page information, advertisement information, and associations between the stored web page information and the advertisement information, such as probability scores indicating that certain advertisements match one or more themes of a respective web page and logical associations between advertisement information and web page information, as described in detail below.

In one embodiment, the mapping database 452 may be implemented as a relational database, and includes a number of tables having entries, or records, that are linked by indices and keys. In an alternative embodiment, the mapping database 452 may be implemented as a collection of objects in an object-oriented database. Central to the database 452 shown in FIG. 5 are one or more page fables 530, which contain records for each web page stored within the content taxonomy 510. The database 452 also includes one or more advertisement tables 540, which may be linked to the page tables 530 and may be populated with records for each advertisement stored within the advertising taxonomy 520.

In one embodiment, the mapping database 452 may further include a number of other tables, which may also be linked to the page tables 530 and the advertisement tables 540, such as, for example, tables specifically provided to enable exemplary embodiments of the present invention. One or more mapping probability tables 550 are configured to store multiple probability scores, each score indicating the probability that a certain type of advertisements stored within the advertising taxonomy 520 matches the one or more themes of a respective web page stored within the content taxonomy 510. One or more advertising ontology tables 560 are configured to store logical associations between advertisements stored within the advertising taxonomy 520 and content of the web pages stored within the content taxonomy 510.

In one example, a web page requested by a user contains information about golf-related events and location of respective golf courses where the events may take place, and further details a profile of a golf player named John Maytag. The web page is associated with golf-related categories of the content taxonomy 510, such as "Sports" and "Travel." At the same time, the golf-related web page may be associated, for example, with predetermined luxury-related categories of the content taxonomy 510, such as, for example, "Jewelry," since it is presumed that golf as a sport may be logically associated with high income participants, which are historically more inclined to purchase luxury consumer products. Thus, the content taxonomy may be represented as follows:

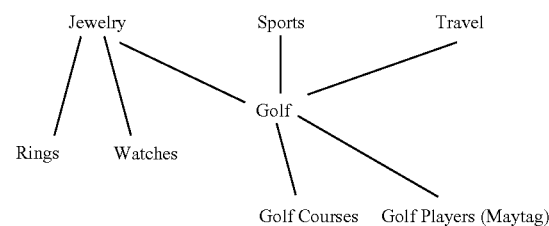

In one embodiment, the advertising taxonomy 520 may contain a similar hierarchical representation and may store, for example, advertisements for golf courses, golf apparel, travel trips, luxury watches, at respective nodes within the taxonomy 520. Furthermore, in our example, the mapping database 452 stores multiple probability scores indicating probabilities that the advertisements described above match the "sports/golf" and "travel" themes of the web page. In addition, the mapping database 452 may also store logical associations showing that advertisements for luxury watches match ontologically the content of the golf-related web page, but advertisements for the "Maytag" brand of dishwashers are not effective on a sports/golf or travel-related web page and receive low scores. As a result, one example of a table illustrating data stored within the mapping database 452 may be represented as follows.

|  | GOLF | WATCHES | DISHWASHERS |
| --- | --- | --- | --- |
| GOLF | 0.9 | 0.7 | 0 |
| WATCHES | 0.7 | 0.9 | 0.1 |
| DISHWASHERS | 0 | 0.1 | 0.9 |

In the table shown above, the vertical categories correspond to web page information and the horizontal categories correspond to advertising information stored respectively within the mapping database 452. The table illustrates that the likelihood that golf-related advertisements and watch-related advertisements match golf-related and watch-related web pages is high, as reflected in high probability scores, while the dishwasher-related advertisements receive low probability scores in relation to the golf-related and watch-related web pages, but high probability scores on appliance/dishwasher-related pages. In one embodiment, the mapping matrix shown above is learned and populated by aggregating feedback information on click events performed by user entities 230 and by tracking the number of advertisement impressions on particular web pages.

Figure 6:
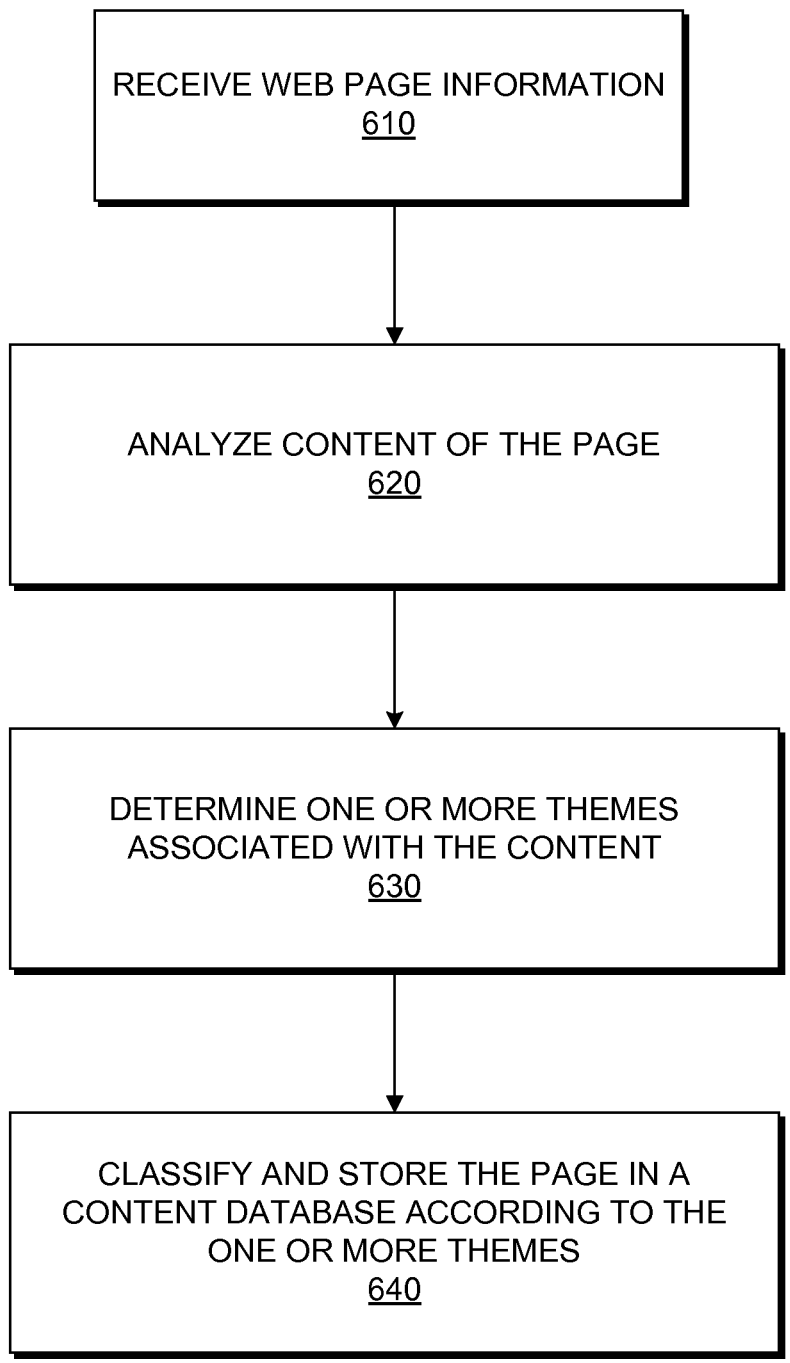
FIG. 6 is a flow diagram illustrating a method to process events, such as web pages, received at the network-based entity, according to one embodiment of the invention.

FIG. 6 is a flow diagram illustrating a method to process events, such as web pages, received at the network-based entity, according to one embodiment of the invention. As shown in FIG. 6, at processing block 610, web page information is received. In one embodiment, the web servers 202 receive an event, such as, for example, a web page, and its associated content information, such as, for example, a golf-related sports web page, via the network 220 from the user entities 230, and/or the publisher entities 240, and/or other entities connected to the network 220. The web servers 202 forward the web page and the content information to the processing and matching platform 208.

At processing block 620, the content of the page is analyzed. In one embodiment, the semantic matching engine 410 within the platform 208 receives the web page information and parses the web page to analyze its associated content information and to extract predetermined features of the content information.

At processing block 630, one or more themes associated with the content of the web page are determined. In one embodiment, the semantic matching engine 410 extracts one or more themes associated with the parsed content information. Considering the case of the golf-related web page containing information about golf-related events and location of respective golf courses where the events may take place, the semantic matching engine 410 extracts a "sports" theme and a "travel" theme for the received web page.

At processing block 640, the web page is classified and stored in a content database according to the extracted themes. In one embodiment, the semantic matching engine 410 classifies and stores the received web page in the content database 451 within, for example, the content taxonomy 510, according to the themes of the web page. In the case of the golf-related web page, the semantic matching engine 410 classifies the page under the "sports" and the "travel" categories of the content taxonomy 510.

Figure 7:
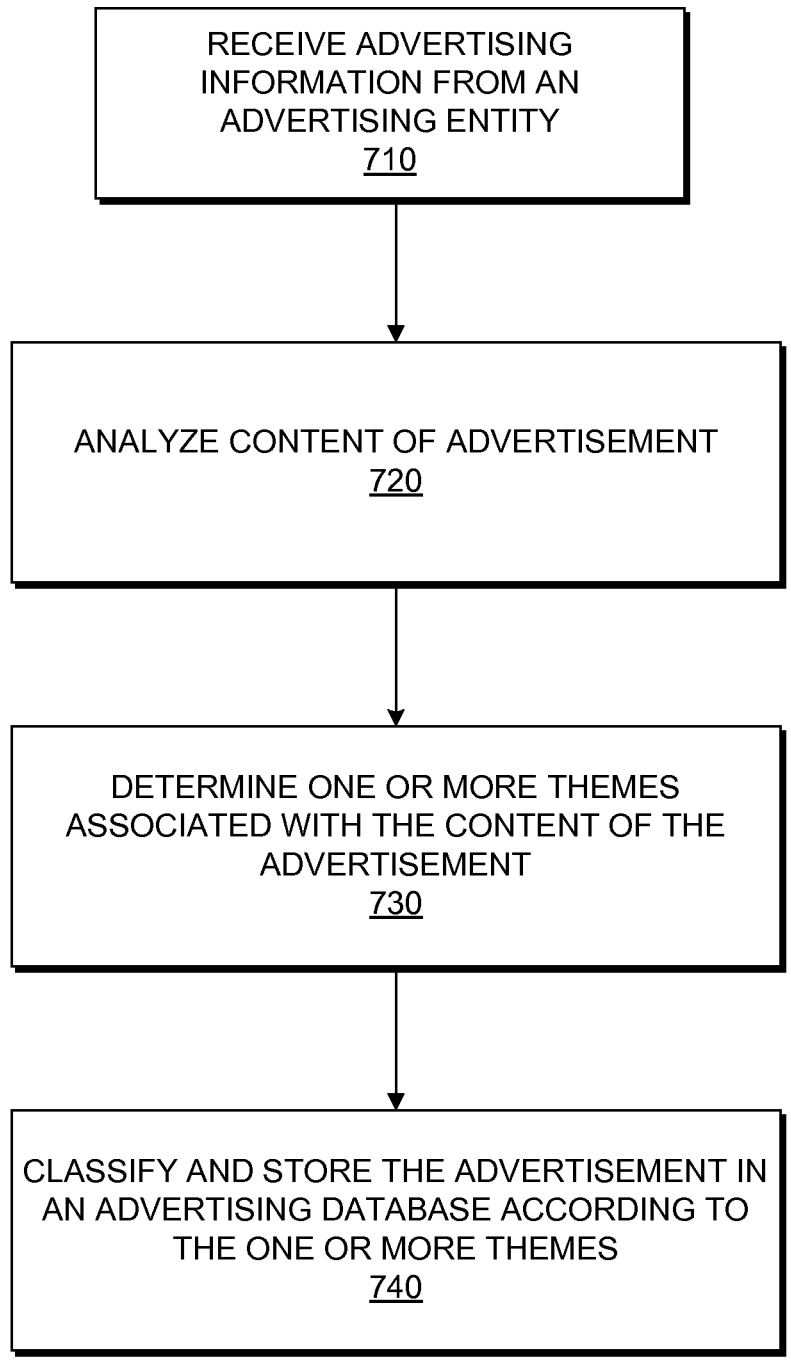
FIG. 7 is a flow diagram illustrating a method to process advertisements received at the network-based entity, according to one embodiment of the invention.

FIG. 7 is a flow diagram illustrating a method to process advertisements received at the network-based entity, according to one embodiment of the invention. As shown in FIG. 7, at processing block 710, advertising information is received. In one embodiment, the web servers 202 receive an event, such as, for example, an advertisement, and its associated content information, such as, for example, a golf-related sports advertisement, via the network 220 from advertiser entities 250 connected to the network 220. The web servers 202 forward the advertisement to the advertising servers 204.

At processing block 720, the content of the advertisement is analyzed. In one embodiment, the advertising servers 204 within the entity 200 receive the advertisement and parse the advertisement to analyze its associated content information and to extract predetermined features related to the content.

At processing block 730, one or more themes associated with the content of the advertisement are determined. In one embodiment, the advertising servers 204 extract one or more themes associated with the parsed advertising content information. Considering the case of a golf-related sports advertisement containing information about golf clubs and location of stores carrying such golf clubs, the advertising servers 204 extract a "sports" theme for the received advertisement.

At processing block 740, the advertisement is classified and stored in an advertising database according to the extracted themes. In one embodiment, the advertising servers 204 classify and store the received advertisement in the advertising database 453 within, for example, the advertising taxonomy 520, according to the themes of the advertisement. In the case of the advertisement for golf clubs, the advertising servers 204 classify the advertisement under the "sports" category of the advertising taxonomy 520.

Figure 8:
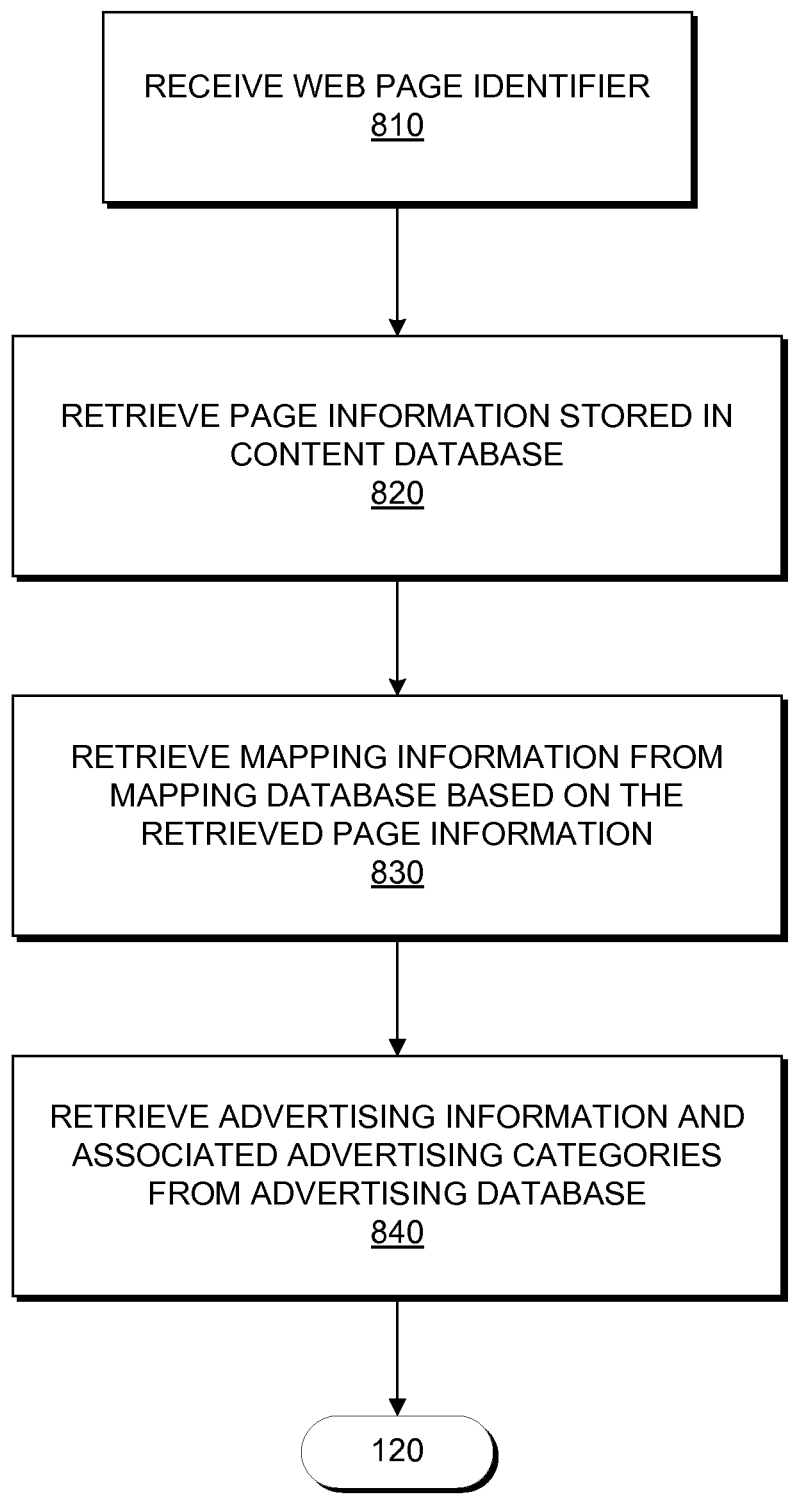
FIG. 8 is a flow diagram illustrating a method to facilitate semantic matching of content to corresponding advertising information, according to one embodiment of the invention.

FIG. 8 is a flow diagram illustrating a method to facilitate semantic matching of content to corresponding advertising information, according to one embodiment of the invention. The processing sequence described in FIG. 8 accomplishes the selection of advertisements and their associated advertising categories related to one or more themes of a requested web page, as described above at processing block 110 of FIG. 1.

As shown in FIG. 8, at processing block 810, a request for advertisements is received, the request containing a web page identifier, such as, for example, a Universal Resource Locator (URL). In one embodiment, the web servers 202 receive a request for advertisements from a user entity 230 via the client machine 232 and the network 220 or, in the alternative, from the publisher entities 240. The web servers 202 further forward the request and the web page identifier to the processing and matching platform 208 within the entity 200.

At processing block 820, page information related to the web page is retrieved from the content database. In one embodiment, the semantic matching engine 410 receives the web page request and uses the web page identifier to access the content taxonomy 510 within the content database 451 and to retrieve information related to the web page, such as, for example, content categories associated with the given web page and stored within the content taxonomy 510. For example, if the user entity 230 requests advertisements for a web page that presents information about a golf player named "John Maytag," and transmits the URL of the page to the web servers 202, the semantic matching engine 410 retrieves information related to the golf player from the content taxonomy 510, such as, for example, the associated categories "sports/golf," "travel/golf," and other related content categories.

At processing block 830, mapping information is retrieved from the mapping database based on the retrieved web page information. In one embodiment, the semantic matching engine 410 accesses corresponding tables within the mapping database 452 to retrieve mapping information related to the retrieved web page categories. The semantic matching engine 410 uses the page tables 530, the advertisement tables 540, the mapping probability tables 550, and the advertising ontology tables 560 to retrieve a mapping of the web page to advertisements stored within the advertising taxonomy 520. Considering the John Maytag golf-related web page information, the semantic matching engine 410 maps, the "sports/golf" category and the "jewelry/watches" category to corresponding advertising categories based on the corresponding probability scores stored within the mapping probability tables 550 and the advertising ontology information stored within the advertising ontology tables 560.

At processing block 840, advertising information and associated advertising categories are retrieved from the advertising database based on the mapping information. In one embodiment, the semantic matching engine 410 uses the mapping information to access the advertising taxonomy 520 within the advertising database 453 and to retrieve advertisements and their associated advertising categories that match the mapping information. In one example, the semantic matching engine 410 uses the mapping of the "sports/golf" category and the "jewelry/watches" category of the web page to retrieve advertisements related to the "sports/golf" advertising category and the "jewelry/watches" advertising category stored within the advertising taxonomy 520. Finally, the processing sequence jumps to processing block 120 of FIG. 1.

Figure 9:
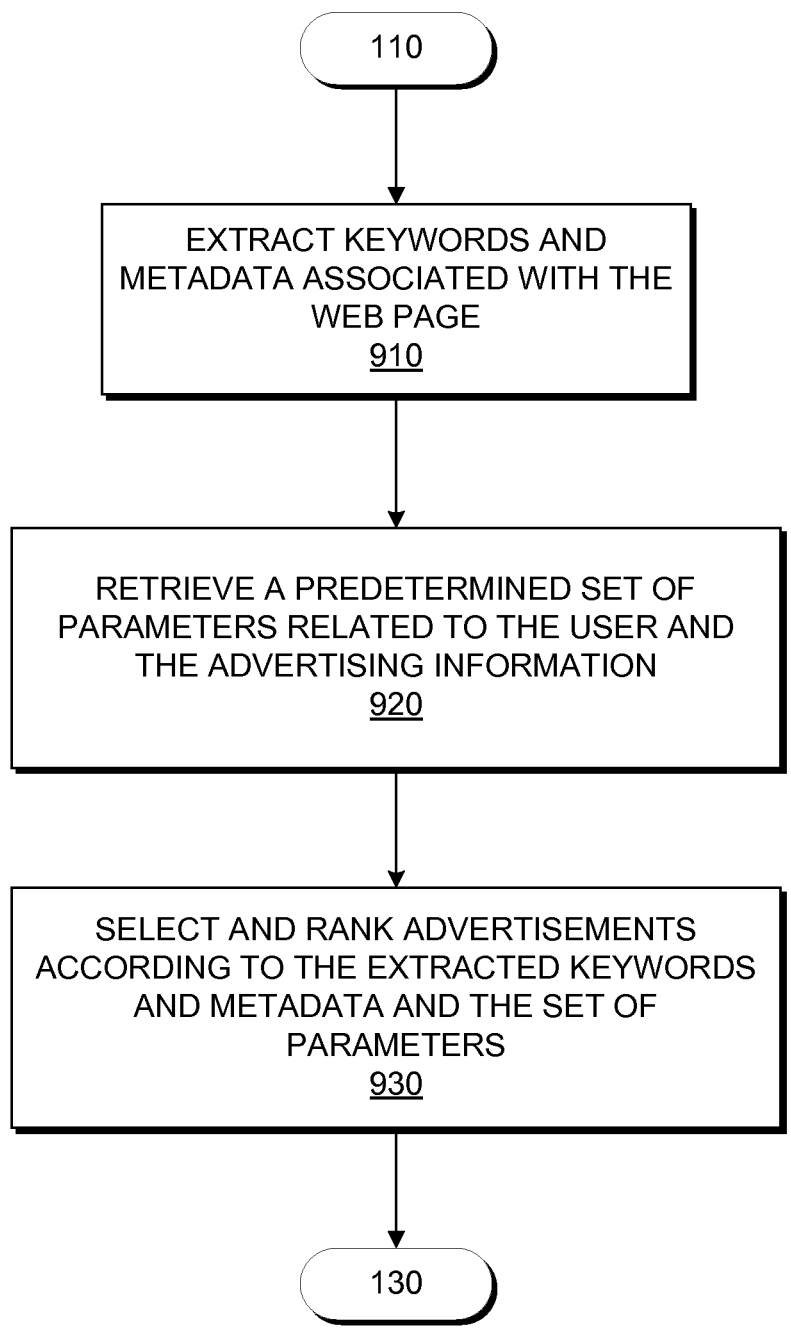
FIG. 9 is a flow diagram illustrating a method to facilitate syntactic matching of content to corresponding advertising information, according to one embodiment of the invention.

FIG. 9 is a flow diagram illustrating a method to facilitate syntactic matching of content to corresponding advertising information, according to one embodiment of the invention. The processing sequence described in FIG. 9 accomplishes the selection and ranking of advertisements that closely match text and metadata within the web page and further match a set of predetermined parameters stored within the multiple databases of the data storage module 210 as described above at processing block 120 of FIG. 1.

At processing block 910, keywords and associated metadata information are extracted from the web page. In one embodiment, the semantic matching engine 410 transmits web page information to the text and metadata extractor 440 via the syntactic matching engine 420. The text and metadata extractor 440 extracts keywords and metadata from the web page, such as, for example, actual page keywords, anchor text metadata, and other syntactic parameters.

At processing block 920, a predetermined set of parameters related to the user and the advertising information are retrieved. In one embodiment, the syntactic matching engine 420 accesses various databases within the data storage module 210 to retrieve a predetermined set of parameters.

The syntactic matching engine 420 retrieves user profile information related to the user entity 230 from the user database 455, such as, for example, geographical location of the user (e.g., San Francisco Bay Area), user account information, and other components of the user profile.

The syntactic matching engine 420 further retrieves business rules from the business rules database 454, such as, for example, rules expressing constraints on the display of certain advertisements in association with specific web pages (e.g., "Cannot display advertisements related to a specific advertiser on a web page maintained by a web site sponsored by a competitor of the advertiser").

The syntactic matching engine 420 further retrieves advertisement parameters related to each of the retrieved advertisements from the supply/budget databases 458, such as, for example, budget constraints for each advertisement, a click-through-rate (CTR) threshold associated with each advertisement, a maximum number of impressions required by the advertiser entity 250, and other parameters related to the financial aspects of the advertisements.

At processing block 930, advertisements are further selected and ranked according to the extracted keywords and associated metadata of the web page and the set of retrieved parameters. In one embodiment, the syntactic matching engine 420 selects advertisements based on the extracted keywords, the extracted metadata of the web page, and the set of retrieved parameters and further ranks the selected advertisements based on the above criteria. Finally, the processing sequence jumps to processing block 130 of FIG. 1.

Figure 10:
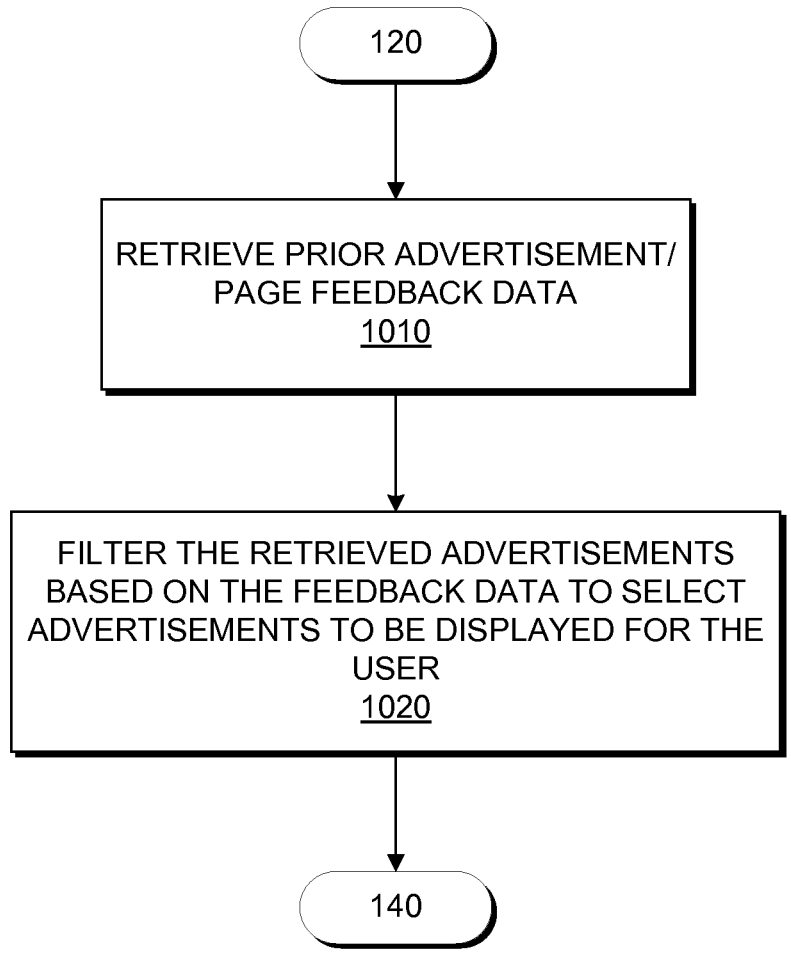
FIG. 10 is a flow diagram illustrating a method to optimize selected advertisements for subsequent display to the user, according to one embodiment of the invention.

FIG. 10 is a flow diagram illustrating a method to optimize selected advertisements for subsequent display to the user, according to one embodiment of the invention. The processing sequence described in FIG. 10 accomplishes the optimization of ranked advertisements to obtain advertisements to be displayed for the user, as described above at processing block 130 of FIG. 1.

As shown in FIG. 10, at processing block 1010, prior advertisement/page feedback data is retrieved. In one embodiment, the optimization engine 430 accesses the content database 451, the mapping database 452, and the advertising database 453 to retrieve feedback data containing prior instances of pairing of advertisements with web pages similar to the requested web page. The feedback data contains short-term advertisement/page pairs and is continuously updated at the entity 200.

At processing block 1020, the advertisements selected and ranked at blocks described in connection with FIG. 9 are further filtered based on the feedback data to select advertisements to be displayed for the user. In one embodiment, the optimization engine 430 receives the ranked list of advertisements from the syntactic matching engine 420 and filters the entire list of advertisements based on the short-term advertisement/page feedback data to obtain optimized advertisements ready to be displayed on the client machine 232 of the user entity 230 within the requested web page. The optimization engine 430 further forwards the optimized advertisements to the web servers 202 to be transmitted to the client machine 232 via the network 220, or, in the alternative, to the publisher entities 240. Finally, the processing sequence jumps to processing block 140 of FIG. 1.

Figure 11:
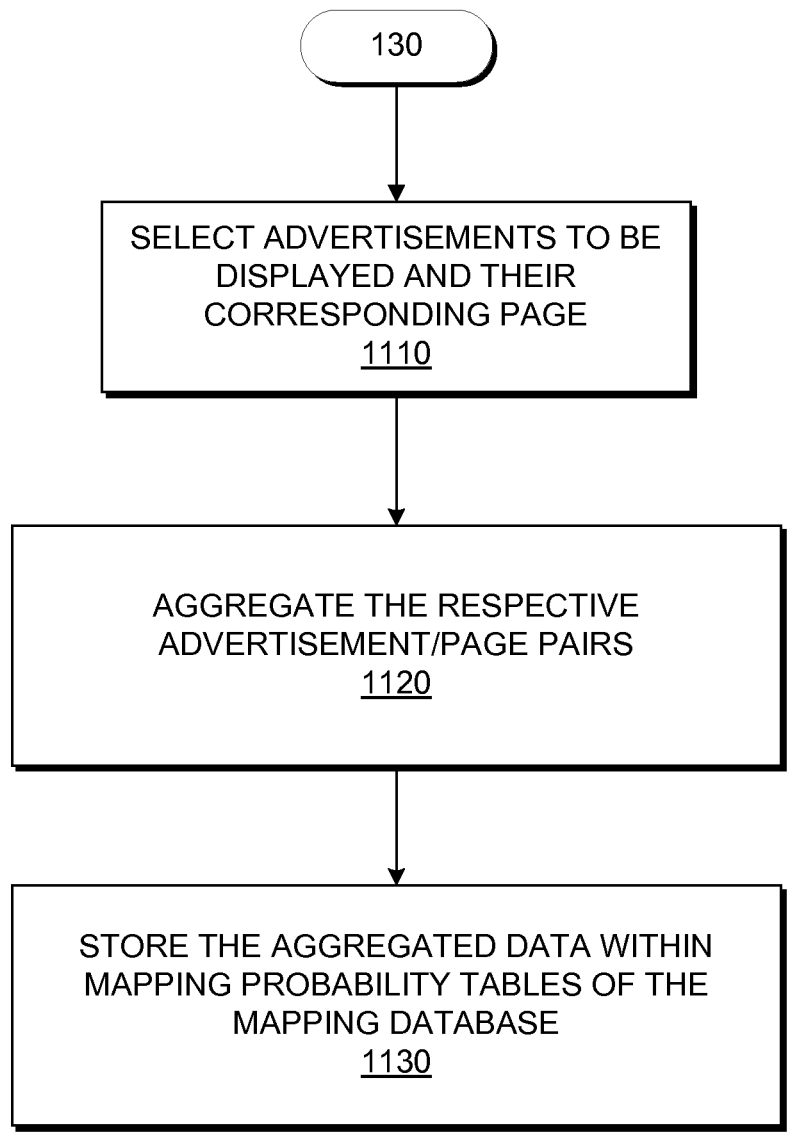
FIG. 11 is a flow diagram illustrating a method to update a mapping database within the data storage module based on the optimized advertisements and the associated content, according to one embodiment of the invention.

FIG. 11 is a flow diagram illustrating a method to update a mapping database within the data storage module based on the optimized advertisements and the associated content, according to one embodiment of the invention. The processing sequence described in FIG. 11 accomplishes the storage of optimized advertisements within the mapping database, as described above at processing block 140 of FIG. 1.

As shown in FIG. 11, at processing block 1110, optimized advertisements to be displayed in connection with a web page requested by a user entity 230 are selected. In one embodiment, the optimization engine 430 within the platform 208 selects the optimized advertisements to be displayed with the corresponding web page on the client machine 232 of the user entity 230.

At processing block 1120, the respective advertisement/page pairs are aggregated. In one embodiment, the optimization engine 430 aggregates the selected advertisements and their corresponding web page to eliminate any duplicate advertisement/page pair and to obtain aggregated data.

Finally, at processing block 1130, the aggregated data is stored within the mapping database 452. In one embodiment, the optimization engine 430 stores the aggregated data within the mapping probability tables 550 of the mapping database 452 and updates the probability scores accordingly to reflect the newly paired advertisement information and web page information. At the same time, in one embodiment, the content taxonomy 510 and the advertising taxonomy 520 may also be updated to reflect the new advertisement/page category information within the aggregated data.

Figure 12:
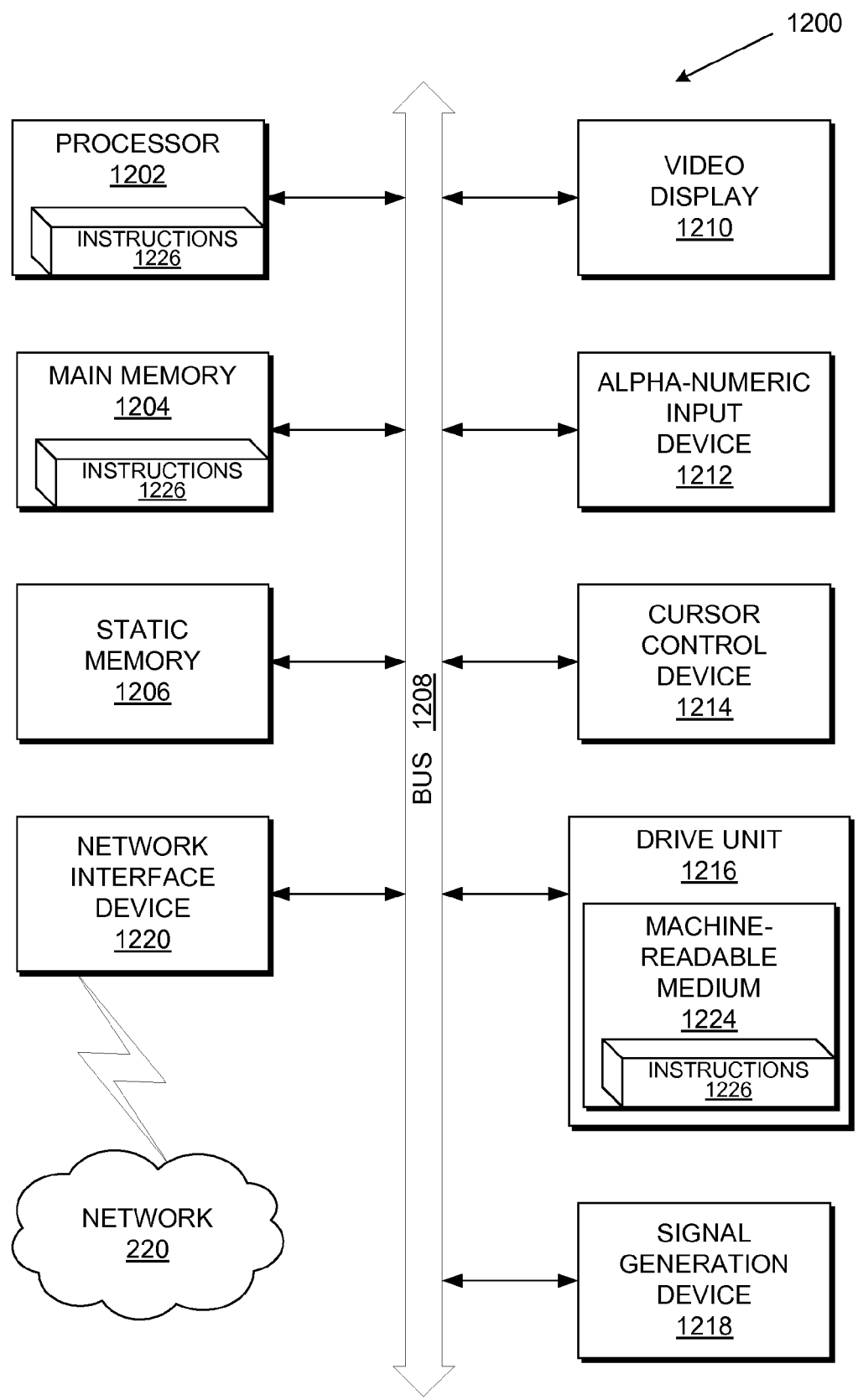
FIG. 12 is a diagrammatic representation of a machine in the exemplary form of a computer system within which a set of instructions may be executed.

FIG. 12 shows a diagrammatic representation of a machine in the exemplary form of a computer system 1200 within which a set of instructions, for causing the machine to perform any one of the methodologies discussed above, may be executed. In alternative embodiments, the machine may comprise a network router, a network switch, a network bridge, Personal Digital Assistant (PDA), a cellular telephone, a web appliance or any machine capable of executing a sequence of instructions that specify actions to be taken by that machine.

The computer system 1200 includes a processor 1202, a main memory 1204 and a static memory 1206, which communicate with each other via a bus 1208. The computer system 1200 may further include a video display unit 1210 (e.g., a liquid crystal display (LCD) or a cathode ray tube (CRT)). The computer system 1200 also includes an alphanumeric input device 1212 (e.g., a keyboard), a cursor control device 1214 (e.g., a mouse), a disk drive unit 1216, a signal generation device 1218 (e.g., a speaker), and a network interface device 1220.

The disk drive unit 1216 includes a machine-readable medium 1224 on which is stored a set of instructions (i.e., software) 1226 embodying any one, or all, of the methodologies described above. The software 1226 is also shown to reside, completely or at least partially, within the main memory 1204 and/or within the processor 1202. The software 1228 may further be transmitted or received via the network interface device 1220 over the network 220.

It is to be understood that embodiments of this invention may be used as or to support software programs executed upon some form of processing core {such as the CPU of a computer) or otherwise implemented or realized upon or within a machine or computer readable medium. A machine readable medium includes any mechanism for storing or transmitting information in a form readable by a machine (e.g., a computer). For example, a machine readable medium includes read-only memory (ROM); random access memory (RAM); magnetic disk storage media; optical storage media; flash memory devices; or any other type of media suitable for storing or transmitting information.

In the foregoing specification, the invention has been described with reference to specific exemplary embodiments thereof. It will, however, be evident that various modifications and changes may be made thereto without departing from the broader spirit and scope of the invention as set forth in the appended claims. The specification and drawings are, accordingly, to be regarded in an illustrative sense rather than a restrictive sense.

What is claimed is:

1. A computer-implemented method comprising:
    receiving, by a processor, a request for advertising information in association with web page content information within a web page requested by a user entity;
    retrieving, by a processor, a content category associated with said web page content information from a hierarchical content taxonomy based on a theme of said web page content information;
    retrieving, by a processor, an advertising category associated with said advertising information from a hierarchical advertising taxonomy based on a mapping probability table that associates the content category with the advertising category,
        wherein the mapping probability table comprises:
            a match between the theme of the web page content information and an advertisement in the advertising category, wherein the match is based on a logical association of the content category and the advertising category and not upon the web page content information alone; and
            mapping information, comprising at least one probability score corresponding to a likelihood, based on the match, that a viewer who is interested in said content category is interested in the advertising category; and
    retrieving, by a processor, the advertisement to display on the user entity.

2. The computer-implemented method according to claim 1, wherein said request for advertising information is received from a user entity over a network.

3. The computer-implemented method according to claim 1, wherein said request for advertising information is received from a publisher entity over a network.

4. The computer-implemented method according to claim 1, further comprising:
    selecting, by a processor, a plurality of advertisements from said advertising information based on keywords and metadata stored within said web page and a set of predetermined parameters; and
    ranking, by a processor, said selected advertisements to obtain a ranked list of advertisements.

5. The computer-implemented method according to claim 4, further comprising:
    extracting, by a processor, said keywords and said metadata associated with said web page; and
    retrieving, by a processor, said predetermined set of parameters from at least one database.

6. The computer-implemented method according to claim 5, wherein said predetermined set of parameters further comprises at least one of user profile information related to said user entity, business rules related to processing and display of said advertisements, and financial parameters related to said selected advertisements.

7. The computer-implemented method according to claim 4, further comprising:
    optimizing, by a processor, said ranked list of advertisements based on feedback data to obtain a list of optimized advertisements to be displayed for said user entity on said requested web page.

8. A computer system comprising:
    at least one web server, comprising a processor and memory, the at least one web server configured to receive a request for advertising information in association with web page content information within a web page requested by a user entity; and
    a processing and matching platform, comprising a processor and memory, coupled to said at least one web server, the processing and matching platform configured to:
    retrieve a content category associated with said web page content information from a hierarchical content taxonomy based on a theme of said web page content information;
    retrieve an advertising category associated with said advertising information from a hierarchical advertising taxonomy based on a mapping probability table that associates the content category with the advertising category,
        wherein the mapping probability table comprises:
            a match between the theme of the web page content information and an advertisement in the advertising category, wherein the match is based on a logical association of the content category and the advertising category and not upon the web page content information alone; and
            mapping information, comprising at least one probability score corresponding to a likelihood, based on the match, that a viewer who is interested in said content category is interested in the advertising category associated with said advertising information; and
    retrieve said advertisement to display on the user entity.

9. The computer system according to claim 8, wherein said request for advertising information is received from a user entity over a network.

10. The computer system according to claim 8, wherein said request for advertising information is received from a publisher entity over a network.

11. The computer system according to claim 8, wherein said platform is further configured to:
    select advertisements from said advertising information based on keywords and metadata stored within said web page and a set of predetermined parameters, and
    rank said selected advertisements to obtain a ranked list of advertisements.

12. The computer system according to claim 11, wherein said platform is further configured to:
   extract said keywords and said metadata associated with said web page, and
   retrieve said predetermined set of parameters from at least one database.

13. The computer system according to claim 12, wherein said predetermined set of parameters further comprises at least of user profile information related to said user entity, business rules related to processing and display of said advertisements, and financial parameters related to said selected advertisements.

14. The computer system according to claim 11, wherein said platform is further configured to optimize said ranked list of advertisements based on feedback data to obtain a list of optimized advertisements to be displayed on said requested web page.

15. A non-transitory computer readable storage medium containing executable instructions, which, when executed in a processing system by a processor, cause said system to perform acts of:
   receiving a request for advertising information in association with web page content information within a web page requested by a user entity;
   retrieving a content category associated with said web page content information from a hierarchical content taxonomy based on a theme of said web page content information;
   retrieving an advertising category associated with said advertising information from a hierarchical advertising taxonomy based on a mapping probability table that associates the content category with the advertising category,
   wherein the mapping probability table comprises:
      a match between the theme of the web page content information and an advertisement in the advertising category, wherein the match is based on a logical association of the content category and the advertising category and not upon the web page content information alone; and
      mapping information, comprising at least one probability score corresponding to a likelihood, based on the match, that a viewer who is interested in said content category is interested in the advertising category; and
   retrieving the advertisement to display on the user entity.

16. The non-transitory computer readable storage medium according to claim 15, wherein said request for advertising information is requested from a user entity over a network.

17. The non-transitory computer readable storage medium according to claim 15, wherein said request for advertising information from a publisher entity over a network.

18. The non-transitory computer readable storage medium according to claim 15, wherein said executable instructions, when executed in a processing system by a processor, further cause said system to perform acts of:
   selecting advertisements from said advertising information based on keywords and metadata stored within said web page and a set of predetermined parameters; and
   ranking said selected advertisements to obtain a ranked list of advertisements.

19. The non-transitory computer readable storage medium according to claim 18, wherein said executable instructions, when executed in a processing system by a processor, further cause said system to perform acts of:
   extracting said keywords and said metadata associated with said web page; and
   retrieving said predetermined set of parameters form at least one database.

20. The non-transitory computer readable storage medium according to claim 19, wherein said predetermined set of parameters further comprises at least one of user profile information related to said user entity, business rules related to processing and display of said advertisements, and financial parameters related to said selected advertisements.

21. The non-transitory computer readable storage medium according to claim 18, wherein said executable instructions, when executed in a processing system by a processor, further cause said system to perform acts of:
   optimizing said ranked list of advertisements based on feedback data to obtain a list of optimized advertisements to be displayed for said user entity on said requested web page.

22. The non-transitory computer readable storage medium according to claim 21, wherein said executable instructions, when executed in a processing system by a processor, further cause said system to perform acts of:
   storing said optimized advertisements and their association with said web page and said content information within at least one database of said data storage module.

* * * * *